United States Patent
Godefroid et al.

(10) Patent No.: US 10,977,161 B2
(45) Date of Patent: Apr. 13, 2021

(54) AUTOMATIC INTELLIGENT CLOUD SERVICE TESTING TOOL

(71) Applicant: Microsoft Technology Licensing, LLC, Redmond, WA (US)

(72) Inventors: Patrice Godefroid, Mercer Island, WA (US); Marina Polishchuk, Seattle, WA (US); Evangelos Atlidakis, North Bergen, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/992,727

(22) Filed: May 30, 2018

(65) Prior Publication Data
US 2019/0370152 A1     Dec. 5, 2019

(51) Int. Cl.
    *G06F 11/36*    (2006.01)
(52) U.S. Cl.
    CPC ...... *G06F 11/3664* (2013.01); *G06F 11/3684* (2013.01)
(58) Field of Classification Search
    CPC ... G06F 11/36; G06F 11/3664; G06F 11/3684
    USPC ...................................................... 714/38.1
    See application file for complete search history.

(56) References Cited

U.S. PATENT DOCUMENTS

| 10,019,345 | B2* | 7/2018 | Alteneder | G06F 11/3672 |
| 10,437,712 | B1* | 10/2019 | Tyler | G06F 11/3684 |
| 2013/0275946 | A1* | 10/2013 | Pustovit | G06F 11/3684 717/124 |
| 2019/0294531 | A1* | 9/2019 | Avisror | G06F 11/3676 |
| 2019/0294536 | A1* | 9/2019 | Avisror | G06F 8/60 |

OTHER PUBLICATIONS

"An opinionated framework for creating REST-like APIs in Ruby", Retrieved from: http://www.ruby-grape.org/, Retrieved on Mar. 2, 2018, 1 Page.
"Appspider", Retrieved from: https://www.rapid7.com/products/appspider, Retrieved on Mar. 2, 2018, 9 Pages.
"Burp Suite Editions", Retrieved from: https://portswigger.net/burp, Retrieved on Mar. 2, 2018, 8 Pages.
"Gitlab", Retrieved from: https://about.gitlab.com, Retrieved on Mar. 2, 2018, 8 Pages.
"GitLab API", Retrieved from: https://docs.gitlab.com/ee/api/., Retrieved on Mar. 2, 2018, 13 Pages.

(Continued)

Primary Examiner — Kamini B Patel

(57) ABSTRACT

In a method for automatically testing a service via a programming interface of the service includes, a set of operation descriptions describing a set of operations supported by the service is obtained. The set of operation descriptions includes respective descriptions of requests associated with respective operations in the set of operations and responses expected in response to the requests. Based on the set of operation descriptions, dependencies among the requests associated with the respective operations are determined, and a set of test request sequences that satisfy the determined dependencies is generated. Test request sequences in the set of test request sequences are executed to test the service via the programming interface of the service.

20 Claims, 8 Drawing Sheets

(56) References Cited

OTHER PUBLICATIONS

"GitLab Hardware requirements", Retrieved from: https://docs.gitlab.com/ce/install/requirements.html, Retrieved on Mar. 2, 2018, 5 Pages.
"GitLab Statistics", Retrieved from: https://about.gitlab.com/is-it-any-good/, Retrieved on Mar. 2, 2018, 6 Pages.
"Libgit2", Retrieved from: https://github.com/libgit2, Retrieved on Mar. 2, 2018, 4 Pages.
"OAuth 2", Retrieved from: https://oauth.net/, Retrieved on Mar. 2, 2018, 1 Page.
"Peach Fuzzer", Retrieved from: http://www.peachfuzzer.com/, Retrieved on Mar. 2, 2018, 4 Pages.
"Qualys Web Application Scanning", Retrieved from: https://www.qualys.com/apps/web-app-scanning/, Retrieved on Mar. 2, 2018, 11 Pages.
"Rails", Retrieved from: https://rubyonrails.org/, Retrieved on Mar. 2, 2018, 3 Pages.
"SQLite", Retrieved from: https://www.sqlite.org/index.html, Jun. 6, 2018, 1 Page.
"Swagger", Retrieved from: https://swagger.io/, Retrieved on Mar. 2, 2018, 4 Pages.
Allamaraju, Subbu, "RESTful Web Services Cookbook", in Publication of O'Reilly Media, Inc, Mar. 2010, 314 Pages.
Bastani, et al., "Synthesizing Program Input Grammars", in Proceedings of the 38th ACM SIGPLAN Conference on Programming Language Design and Implementation, Jun. 18, 2017, pp. 95-110.
Bradshaw, Stephen, "Fuzzer Automation with Spike", Retrieved from: https://resources.infosecinstitute.com/fuzzer-automation-with-spike/#gref, Dec. 14, 2010, 19 Pages.
Briddigkeit, et al., "TnT-Fuzzer", Retrieved from: https://github.com/Teebytes/TnT-Fuzzer, Retrieved on Mar. 2, 2018, 4 Pages.
Cohen, et al., "The Combinatorial Design Approach to Automatic Test Generation", in Proceedings of IEEE Software, vol. 13, Issue 5, Sep. 1996, pp. 83-88.
Fahndrich, et al., "Embedded contract languages", in Proceedings of the ACM Symposium on Applied Computing, Mar. 22, 2010, pp. 2103-2110.
Fielding, Roy Thomas, "Architectural Styles and the Design of Network-based Software Architectures", in Thesis of University of Caliornia, Jun. 2000, 180 Pages.
Godefroid, et al., "Automated Whitebox Fuzz Testing", in Proceedings of NDSS, Nov. 1, 2008, 16 Pages.
Godefroid, et al., "Grammar-based Whitebox Fuzzing", in Proceedings of the 29th ACM SIGPLAN Conference on Programming Language Design and Implementation, Jun. 7, 2008, pp. 206-215.
Godefroid, et al., "Learn Fuzz Machine Learning for Input Fuzzing", in Proceedings of the 32nd IEEE/ACM International Conference on Automated Software Engineering, Oct. 30, 2017, pp. 50-59.
Hoschele, et al., "Mining Input Grammars from Dynamic Taints", in Proceedings of the 31st IEEE/ACM International Conference on Automated Software Engineering, Sep. 3, 2016, pp. 720-725.
Lammel, et al., "Controllable Combinatorial Coverage in Grammar-Based Testing", in Proceedings of the 18th IFIP TC6/WG6.1 international conference on Testing of Communicating Systems, May 16, 2006, 18 Pages.
Majumdar, et al., "Directed Test Generation using Symbolic Grammars", in Proceedings of the twenty-second IEEE/ACM international conference on Automated software engineering, Nov. 5, 2007, pp. 134-143.
Newman, Sam, "Building Microservices", in Publication of O'Reilly Media, Inc, Feb. 2015, 102 Pages.
Pacheco, et al., "Feedback-Directed Random Test Generation", in Proceedings of the 29th international conference on Software Engineering, May 20, 2007, 10 Pages.
Pereyda, Joshua, "boofuzz Network Protocol Fuzzing for Humans", Retrieved from: https://github.com/jtpereyda/boofuzz., Retrieved on Mar. 2, 2018, 4 Pages.
Pereyda, et al., "OpenRCE sulley", Retrieved from: https://github.com/OpenRCE/sulley, Retrieved on Mar. 2, 2018, 3 Pages.
Peter, et al., "APIFuzzer HTTP API Testing Framework", Retrieved from: https://github.com/KissPeter/APIFuzzer, Retrieved on Mar. 2, 2018, 3 Pages.
Ronacher, Armin, "Flask Web development one drop at a time", Retrieved from: http://flask.pocoo.org/, Retrieved on Mar. 2, 2018, 2 Pages.
Utting, et al., "A Taxonomy of Model-Based Testing Approaches", in Journal of Software Testing, Verification & Reliability, vol. 22, Issue 5, Aug. 2012, pp. 297-312.
Vosmaer, Jacob, "Multiple critical vulnerabilities in GitLab", Retrieved from: https://about.gitlab.com/2013/11/14/multiple-critical-vulnerabilities-in-gitlab/, Nov. 14, 2013, 10 Pages.
Warszawski, et al., "ACIDRain Concurrency Related Attacks on Database Backed Web Applications", in Proceedings of the ACM International Conference on Management of Data, May 14, 2017, 16 Pages.
Yannakakis, et al., "Testing Finite State Machines", in Proceedings of the 23rd Annual ACM Symposium on the Theory of Computing, Jan. 3, 1991, pp. 476-485.
Bai, et al., "WSDL-Based Automatic Test Case Generation for Web Services Testing", in Proceedings of IEEE International Workshop of Service-Oriented System Engineering, Oct. 20, 2005, pp. 207-212.
Choi, et al., "Call-Flow Aware API Fuzz Testing for Security of Windows Systems", in Proceedings of the International Conference on Computational Sciences and Its Applications, Jun. 30, 2008, pp. 19-25.
"International Search Report and Written Opinion Issued in PCT Application No. PCT/US2019/032325", dated: Aug. 6, 2019, 13 Pages. (MS# 404369-WO-PCT).

* cited by examiner

```
from restler import requests
from restler import dependencies def parse_posts(data):
    post_id = data["id"]
    dependencies.set_var(post_id)

request = requests.Request(
    restler.static("POST"),
    restler.static("/api/blog/posts"),
    restler.static(" HTTP/1.1"),
    restler.static("\r\n"),
    restler.static("body: "),
    restler.fuzzable("string"),
    restler.static("\r\n"),
    "post_sent": {
        "parser": parse_posts,
        "dependencies": [
            post_id.writer()
        ]
    }
)
```

FIG. 3A

```
Sending: POST /api/blog/posts/ HTTP/1.1
Accept: application/json
Content-Type: application/json
Host: localhost:8888
{"body": "sampleString"}

Received: HTTP/1.1 201 CREATED
Content-Type: application/json
Content-Length: 37
Server: Werkzeug/0.14.1 Python/2.7.12
Date: Sun, 01 Apr 2018 05:10:32 GMT
{"body": "sampleString", "id": 5880}
```

FIG. 3B

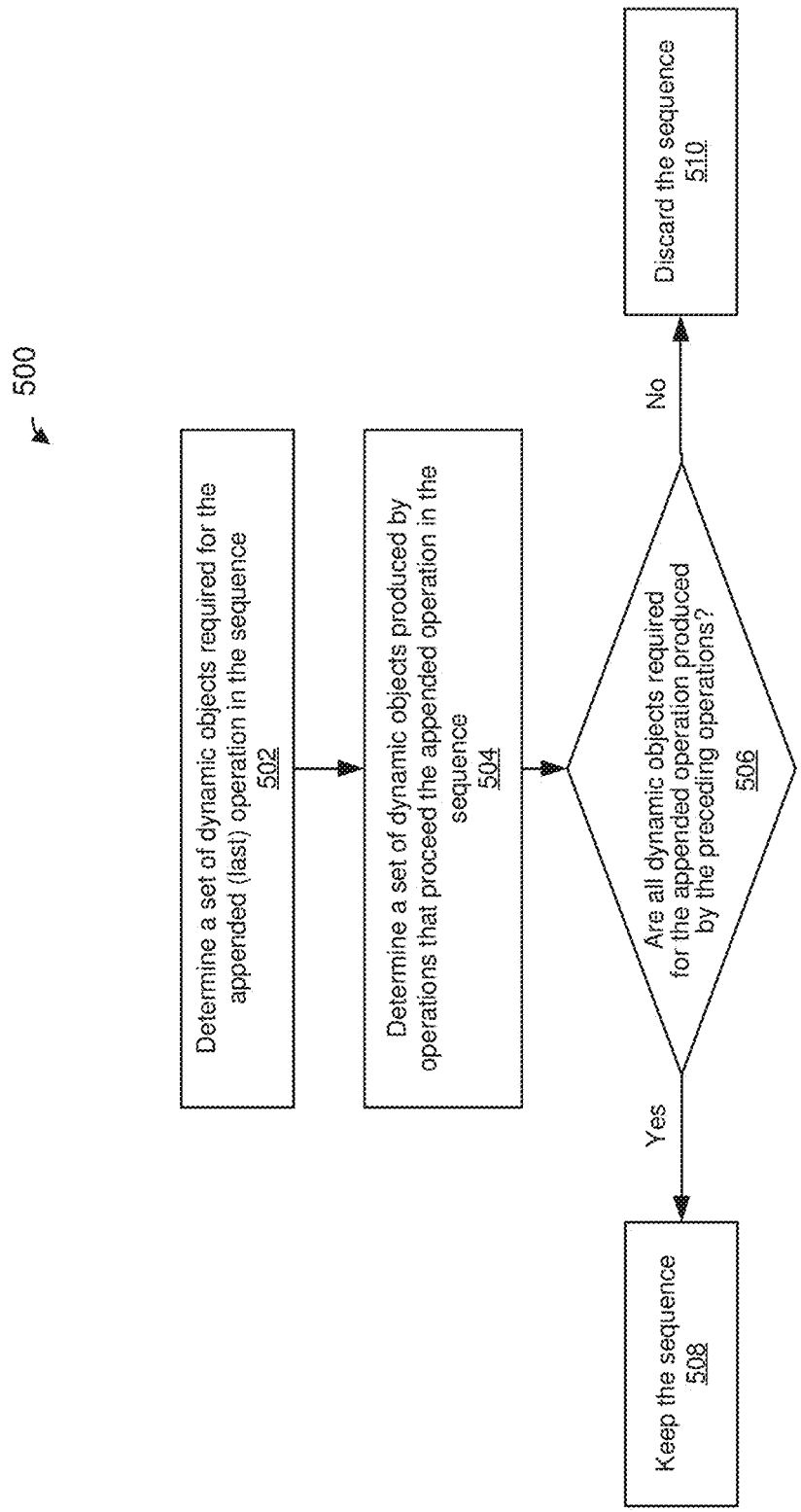

```
 1  Inputs: swagger_spec, maxLength
 2  # Set of requests parsed from the Swagger API spec
 3  reqSet = PROCESS(swagger_spec)
 4  # Set of request sequences (initially empty)
 5  seqSet = {}
 6  # Main loop: iterate up to a given maximum sequence length
 7  n = 1
 8  while (n =< maxLength):
 9      seqSet = EXTEND(seqSet, reqSet)
10      seqSet = RENDER(seqSet)
11      n = n + 1
12  # Extend all sequences in seqSet by appending
13  # new requests whose dependencies are satisfied
14  def EXTEND(seqSet, reqSet):
15      newSeqSet = {}
16      for seq in seqSet:
17          for req in reqSet:
18              if DEPENDENCIES(seq, req):
19                  newSeqSet = newSeqSet + concat(seq, req)
20      return newSeqSet
21  # Concretize all newly appended requests using dictionary values
22  # execute each new request sequence and keep the valid ones
23  def RENDER(seqSet):
24      newSeqSet = {}
25      for seq in seqSet:
26          req = last_request_in(seq)
27          V = tuple_of_fuzzable_types_in(req)
28          for v in V:
29              newReq = concretize(req, v)
30              newSeq = concat(seq, newReq)
31              response = EXECUTE(newSeq)
32              if response has a valid code:
33                  newSeqSet = newSeqSet + newSeq
34              else:
35                  log error
36      return newSeqSet
37  # Check that all objects referenced in a request are produced
38  # by some response in a prior request sequence
39  def DEPENDENCIES(seq, req):
40      if CONSUMES(req) ⊆ PRODUCES(seq):
41          return True
42      else:
43          return False
44  # Objects required in a request
45  def CONSUMES(req):
46      return object_types_required_in(req)
47  # Objects produced in the responses of a sequence of requests
48  def PRODUCES(seq):
49      dynamicObjects = {}
50      for req in seq:
51          newObjs = objects_produced_in_response_of(req)
52          dynamicObjects = dynamicObjects + newObjs
53      return dynamicObjects
```

*FIG. 6*

AUTOMATIC INTELLIGENT CLOUD SERVICE TESTING TOOL

FIELD OF THE DISCLOSURE

The present disclosure relates generally to testing tools and, more particularly, to a tool for testing of a service or application.

BACKGROUND

Services, such as Web Service applications or other application, have become popular for hosting software applications, for providing platforms for data storage and analysis, for providing infrastructure applications, and the like. Such services are often hosted in the cloud and may be accessible and/or programmable via service interfaces, such as application programming interfaces (APIs), which may, for example, conform to a representational state transfer (REST) protocol (e.g., RESTful APIs). An interface of a service may be described by a computer-readable specification associated with the service. Such specification may generally describe requests supported by the service and responses that may expected from the service. Recently, standardized formats for describing application interfaces have been developed. For example, Swagger (or "OpenAPI") is a standardized format commonly utilized for describing a RESTful API.

Testing of such services, for uncovering bugs, finding security vulnerabilities and the like, may be an important for providing functional and reliable services. Automatic testing tools currently used for testing such services typically capture live API traffic, e.g., traffic between a third party application and a service, and may then parse, fuzz and replay the traffic in an effort to find bugs and/or security vulnerabilities in the service. Such tools, however, are not systematic and may not be effective.

SUMMARY

In an embodiment, a method for automatically testing a service via a programming interface of the service includes obtaining, at one or more hardware processors, a set of operation descriptions describing a set of operations supported by the service, wherein the set of operation descriptions includes respective descriptions of i) requests associated with respective operations in the set of operations and ii) responses expected in response to the requests. The method also includes determining, with the one or more hardware processors based on the set of operation descriptions, dependencies among the requests associated with the respective operations. The method further includes generating, with the one or more hardware processors, a set of test request sequences that satisfy the determined dependencies. The method further includes executing, with the one or more hardware processors, test request sequences in the set of test request sequences to test the service via the programming interface of the service.

In another embodiment, a testing system comprises a specification analyzer configured to parse a computer-readable specification describing a programming interface of a service to generate a set of operation descriptions describing a set of operations supported by the service, wherein the set of operation descriptions includes respective descriptions of i) requests associated with respective operations in the set of operations and ii) responses expected in response to the requests. The testing system also comprises a testing engine configured to: determine, based on the set of operation descriptions, dependencies among respective requests associated with the respective operations; generate, based on the set of operation descriptions and the determined dependencies, a set of test request sequences that satisfy the determined dependencies; and execute test request sequences in the set of test request sequences to test the service via the programming interface of the service.

In yet another embodiment, a tangible computer readable medium, or media, storing machine readable instructions that, when executed by one or more processors, cause the one or more processors to: obtain a set of operation descriptions describing a set of operations supported by the service, wherein the set of operation descriptions includes respective descriptions of i) requests associated with respective operations in the set of operations and ii) responses expected in response to the requests; determine, based on the set of operation descriptions, dependencies among respective requests associated with the respective operations; generate, based on the set of operation descriptions and the determined dependencies, a set of test request sequences that satisfy the determined dependencies; and cause test request sequences in the set of test request sequences to be executed to test the service via the programming interface of the service.

BRIEF DESCRIPTION OF THE DRAWINGS

FIG. 3A is a diagram illustrating an example operation description that may be included in a set of operation descriptions generated by the testing system of FIG. 1 based on the service specification of FIG. 2, according to an embodiment;

FIG. 3B illustrates a trace of a request generated based on the operation description of FIG. 3A and a response received in response to executing the request, according to an embodiment;

FIG. 5 is a block diagram of a process for checking dependencies in a test request sequence generated in the process of FIG. 4, according to an embodiment;

FIG. 6 is an example implementation of the process of FIG. 4, according to an embodiment;

DETAILED DESCRIPTION

In various embodiments described below, an automatic testing tool for testing a service, such as a cloud service, generates intelligent tests for systematically testing the service based on analysis of a computer-readable specification that describes a programming interface of the service. Based on analyzing the specification, the testing tool may determine what specific requests are supported by the service, and what responses may be expected from the service, and may generate dependency information for determining dependencies among the specific requests supported by the specification. Based on the dependency information, the testing tool may infer that certain request combinations are not valid or are unsupported. As an example, the testing tool may infer that infer that a request B should not be executed before a request A because the request B takes, as an input, a variable (e.g., a resource id) returned in response to execution of the request A. Based on analyzing the specification, the testing tool may generate, execute and process responses of test request sequences for testing the service. The testing tool may utilize the interred dependencies to automatically avoid executing invalid request sequences when testing the service, thereby reducing complexity of testing and time required to perform the testing of the service, in a least some embodiments. These and other techniques described herein may allow the testing tool to thoroughly and effectively exercise a service without executing all possible test request sequences that may be systematically generated for testing the service, in at least some embodiments.

Figure 1:
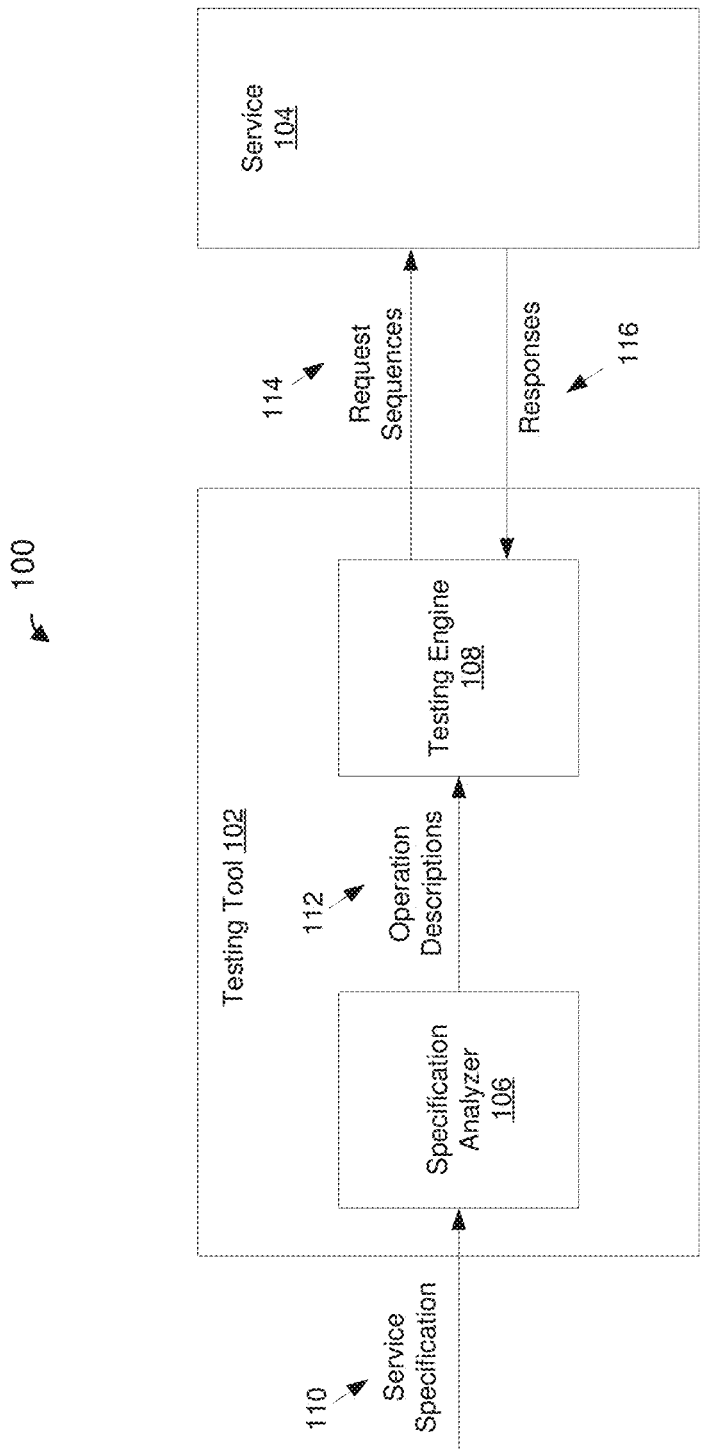
FIG. 1 is a block diagram of an example testing system that may be configured to test a service, according to an embodiment.

FIG. 1 is a block diagram of an example testing system 100, according to an embodiment. The testing system 100 includes a testing tool 102 communicatively coupled to a service 104. The service 104 may generally be a service or an application that may be accessible over a network, such as a cloud service or application accessible over the Internet. The service 104 may, for example, be a software application provided as software-as-a-service (e.g., an email application, a blog hosting application, an office tool application, etc.), a platform provided as platform-as-a-service (e.g., a data mining application, a data analytics application, a software development tool, etc.), an infrastructure provided as infrastructure-as-a service (e.g., computing infrastructure), etc. The service 104 may provide a programming interface, such as an application programming interface (API), that may include a set of routines, objects, operations, functions, etc. accessible by users, third party applications, other services, etc., and may allow the users or other services or applications to interact with, utilize and customize the service or application 104. In an embodiment, the service 104 may conform to a representational state transfer (REST) architecture and may provide a programming interface that conforms to the REST architecture. For example, the service 104 may be a RESTful web service, which may provide a RESTful API. The RESTful API of the service 104 may allow other services or applications to interact with the service 104 over the Internet using the hypertext transfer protocol (HTTP), for example, and may allow the other services or applications to access and manipulate the service 104 using requests transmitted over the Internet using HTTP. The RESTful API of the service 104 may generally expose various functions, modules, etc. of the service 104 using standard operations, such as a GET operation to retrieve a resource (e.g., stored data), a PUT operation to update or otherwise change the state of a resource, a POST operation to create a resource, a DELETE operation to delete a resource, and the like.

The testing tool 102 may be configured to generate, execute and process responses of test request sequences to test the service 104, aimed at uncovering security vulnerabilities, software bugs, etc., in the service 104. The testing tool 102 may include a specification analyzer 106 and a testing engine 108. The specification analyzer 106 may receive, as an input, a specification 110 that may describe the programming interface (e.g., REST API) of the service 104. The specification 110 may be a Swagger or an OpenAPI specification that may utilize the Swagger or OpenAPI interface-description language for describing the format of requests supported by the service 104 and the format of response that may be provided by the service 104. In other embodiments, the specification 110 may be a suitable specification that utilizes an interface-description language different from the Swagger or OpenAPI interface-description language. Based on analyzing the specification 110, the specification analyzer 106 may generate a set operation descriptions 112 identifying and providing descriptions of operations supported by the service 104. The set of operation descriptions 112 may include request generating grammars for generating requests to be provided to the service 104 for executing the respective operations supported by the service 104, and formats of corresponding responses that may be expected from the services 104. The set of operation descriptions 112 may also include information for determining dependencies among the requests supported by the service 104. For example, for each request supported by the service 104, the specification analyzer 106 may indicate any parameters (e.g., dynamic objects such as resource identifiers) that are required as inputs for generating the request, and any parameters (e.g., dynamic objects such as resource identifiers) that are returned by a response to the request. Based on such dependency information in the set of operation descriptions 112, the testing tool 102 may infer dependencies among the requests supported by the service 104. For example, the testing tool 102 may infer that a request B should not be executed before a request A because the request B takes, as an input, a variable (e.g., a resource id) returned in response to execution of the request A. The testing tool 102 may utilize the interred dependencies to automatically avoid executing invalid test request sequences, that do not satisfy the dependencies, when testing the service 104, thereby reducing complexity of testing and time required to perform the testing of the service 104, in a least some embodiments.

Figure 2:
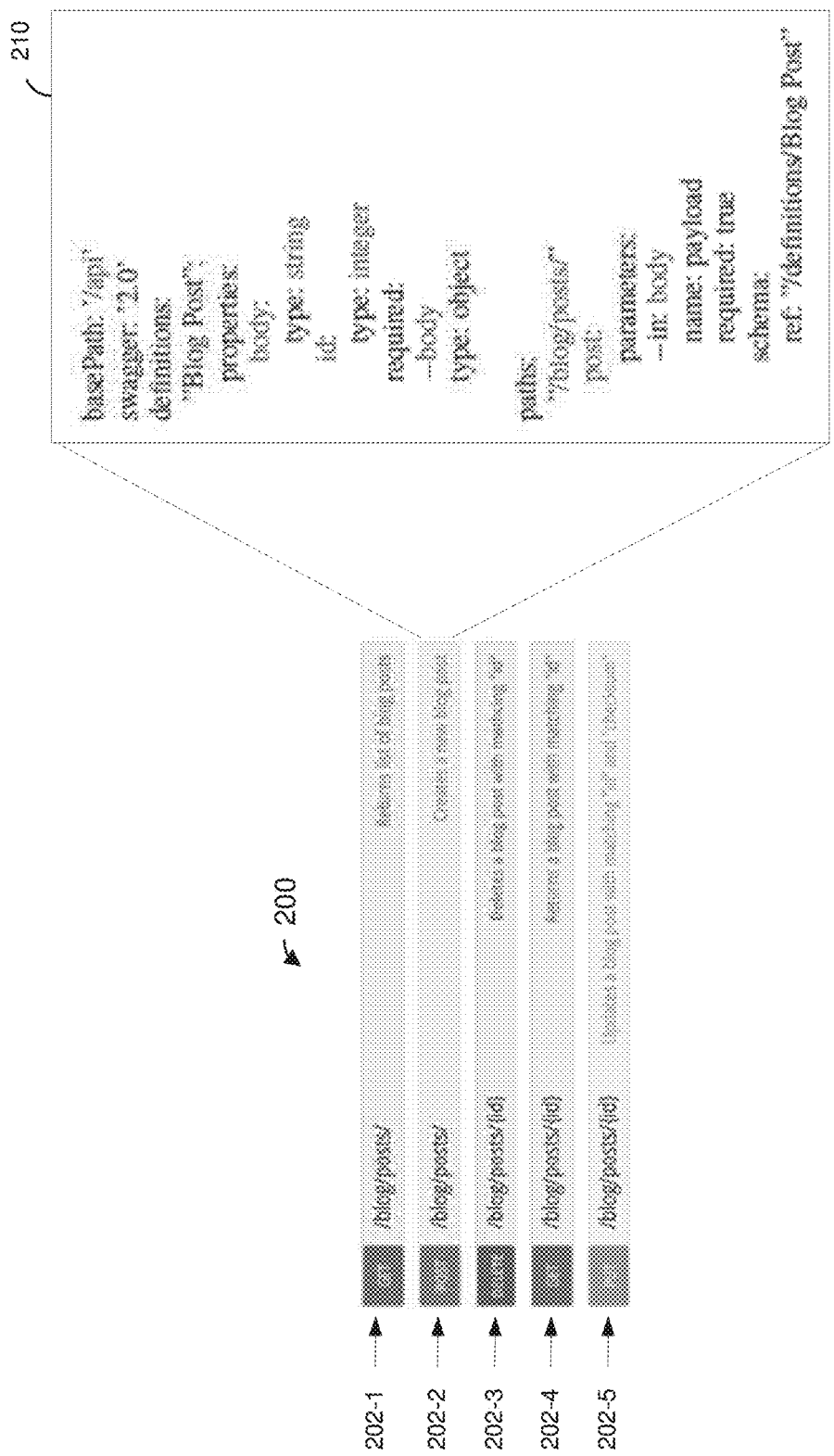
FIG. 2 is a diagram illustrating an example service specification that may be utilized with the testing system of FIG. 1, according to an embodiment.

With continued reference to FIG. 1, the set of operation descriptions 112 may be provided to the testing engine 108. The testing engine 108 may use the set of operation descriptions 112 to generate and execute test request sequences 114 to test the service 104, and may dynamically analyze responses 116 received from the service 104. To perform intelligent testing, without executing test sequences that encompass all possible request combinations, the testing engine 108 may execute only those test sequences that are determined to be valid, by automatically eliminating test request sequences that are determined to be invalid. For example, the testing engine 108 may determine that a test request sequence is invalid if the test request sequence does not satisfy one or more dependencies that may be inferred from the set of operation descriptions 112. The testing engine 108 may determine that the test sequence does not meet one or more dependencies, for example, by determining, based on dependency information in the set of operation descriptions 112, that one or more parameters required as inputs to a request in the test request sequence is not produced by any preceding request in the test request sequence. In response to determining that a test request sequence does not satisfy one or more dependencies, the testing engine 108 may discard this test request sequence without executing the test request sequence. As another example, the testing engine may determine that a test request sequence is invalid by analyzing a response received in response to executing the test request sequence, for example if the response does not indicate successful completion of the test request sequence. In response to determining that a test request sequence is not valid based on a response received in response to executing of the test request sequence, the testing engine 108 may discard the test sequence so that the test request sequence is not used in generating subsequent test sequences for further testing the service 104. These and other techniques described herein may allow the testing tool 102 to thoroughly and effectively exercise the service 104, and to uncover errors in the service 104, without executing all possible test request sequences that may be systematically generated for testing the service 104, in at least some embodiments FIG. 2 is a diagram illustrating an example service specification 200, according to an embodiment. The service specification 200 may correspond to the service specification 110 illustrated in FIG. 1, and, for ease of explanation, the service specification 200 is described below with reference to the testing system 100 of FIG. 1. In other embodiments, however, the service specification 200 may be utilized with suitable testing systems different from the testing system 100 of FIG. 1. Similarly, the testing system 100 of FIG. 1 may utilize suitable service specifications different from the service specification 200, in some embodiments.

The service specification 200 describes a programming interface of a blog hosting service and may be provided in the contest of the service 104 being a blog hosting service. In other embodiments, the service specification 200 may describe interfaces of other suitable services. The programming interface of the blog hosting service may be a RESTful API, or may be another suitable type of programming interface. The service specification 200 may define a set of operations 202 that may be supported the blog hosting service. In the illustrated example, the set of operations 202 includes five operations, including i) a GET operation 202-1 that returns a list of blogs currently hosted by the blog hosting service for a user, ii) a POST operation 202-2 that creates a new blog post, iii) a DELETE operation 202-3 that deletes a blog post, iv) a GET operation 202-4 that returns a particular blog post, and v) a PUT operation 202-5 that updates a particular blog post, in the illustrated embodiment. In other embodiments, service specification 200 may define other suitable sets of operations, including sets of operations having fewer than five operations or greater than five operations.

For each of the operations 202, the service specification 200 specifies a format of a request expected by the blog hosting service for the corresponding operation, and a format of a corresponding response that may be expected from the blog post service in response to executing the operation. FIG. 2 illustrates an example operation specification 210 for the POST operation 202-2, according to an embodiment. The other ones of the operations 202 may have similar operation specifications. The operation specification 210 may be provided in YALM format, as in the illustrated embodiment, or may be provided in another suitable machine readable format. The operation specification 210 may include a definitions portion 212 and a path portion 214. The definitions portion 212 may include definitions of one or more parameters (e.g., objects) that may be required or optional for generating the request for the corresponding operation. For example, the definitions portion 212 indicates that an object named body of type string is required for a request for the POST operation, and that object named id of type integer is optional (not indicated as being required) for the request for the POST operation, in the illustrated embodiment. The path portion 214 may specify a grammar for generating the request, e.g., the syntax for generating the request. The path portion 214 may specify HTTP syntax for the request, as illustrated in FIG. 2, or may specify the syntax of another suitable format.

The testing tool 102 (e.g., the specification analyzer 106) of the testing system 100 of FIG. 1 may analyze the service specification 200, and may automatically generate the set of operation descriptions 112 based on the service specification 200. FIG. 3A is a diagram illustrating an example operation description 300 that may be included in the set of operation descriptions 112 generated based on the specification 200, according to an embodiment. The specification analyzer 106 may generate the operation description 300 based on the POST operation specification 210 of the service specification 200. The specification analyzer 106 may similarly analyze the operation specifications of other operation 202 of the specification 200, and may generate the set of operation descriptions 112 to include respective operation descriptions such as the operation description 300 for each operation 202 of the specification 200.

The operation description 300 may be encoded in an executable code, such as executable python code, and may be executable to automatically generate a request for the operation and process a response received in response to execution of the request by the service 104. The operation description 300 includes a request generation portion 302 and a response processing portion 304. The request generation portion 302 may include a set of static and fuzzable parameters 310 that may be used generate a request. The static and fuzzable parameters 310 may be listed in a proper order for generating the request. A static parameter 310 may indicate a string to be appended to the previous parameter 310, without being modified prior to being appended to the previous parameter 310. A fuzzable parameter 310, on the other hand, may indicate a type of an object to be appended to the previous parameter 310. Subsequently, the indication of the type of a fuzzable parameter may be replaced with a value of the corresponding type. The value of the corresponding type may be selected from a dictionary of values of the type, as will be explained in more detail below, or may be determined in another suitable manner. The request generation portion 302 may be executed to generate a POST request that may then be transmitted to the service 104. FIG. 3B, briefly, illustrates a trace of a POST request 350 that may be generated based on the operation description 300, according to an example embodiment. FIG. 3B additionally illustrated a response 352 that may be received in response to executing the POST request 350, in an example embodiment.

Referring again to FIG. 3A, the response processing portion 304 of the operation description 300 may include code for parsing the response expected to be received in response to execution of the request specified in the request generation portion 302. Parsing of the response may include extracting values one or more parameters returned in the response. For example, parsing the response for the POST request may include extracting a value of an id returned in response to the post request (e.g., "id":5889, in the embodiment illustrated in FIG. 3B). The values of the one or more parameters returned in the response may be memorized (e.g., stored in a memory) so that the values may subsequently be used for generating requests for which the parameters are required or optional inputs, for example.

Figure 4:
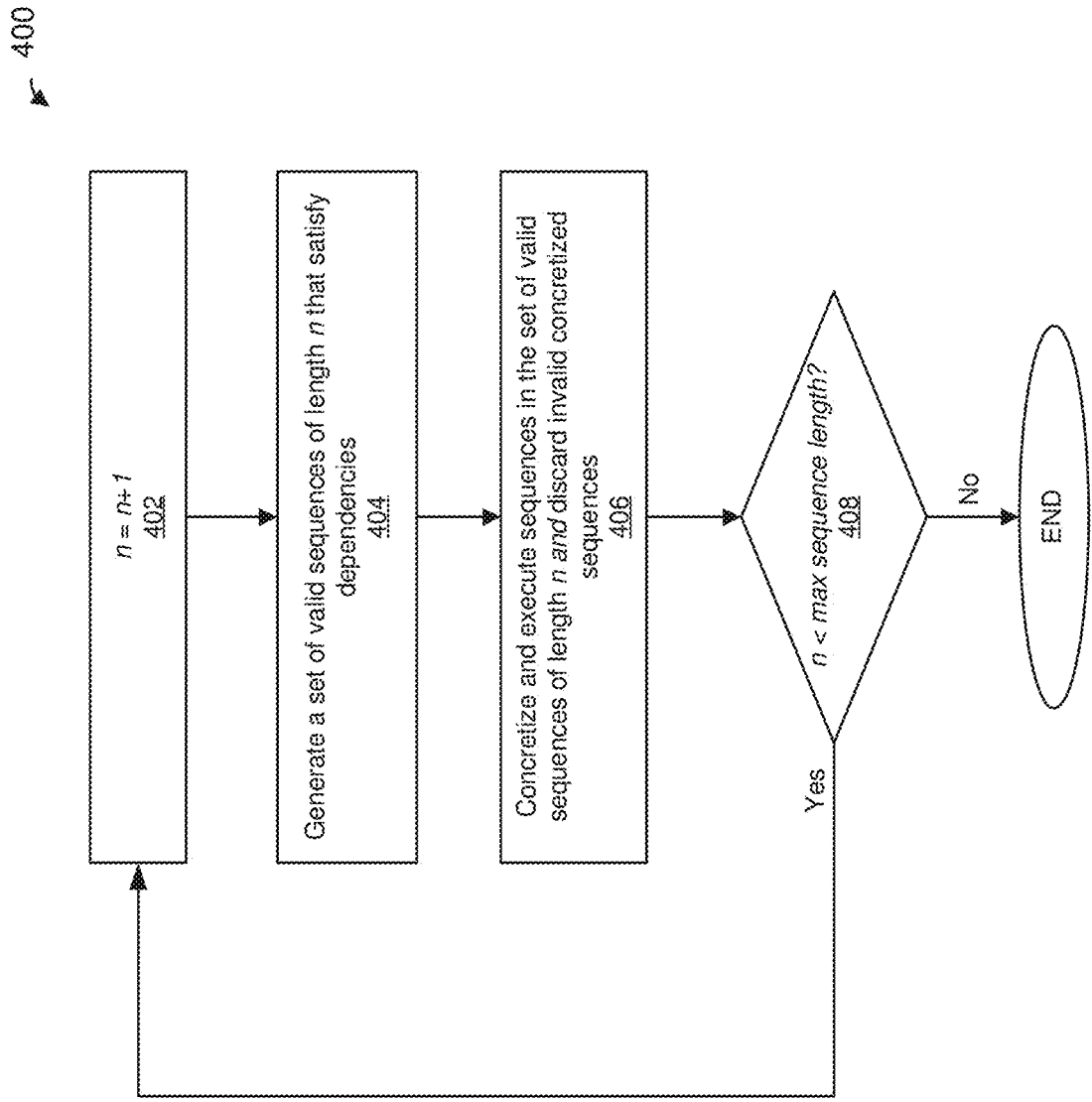
FIG. 4 is a flow diagram of a process for testing a service, according to an embodiment.

FIG. 4 is a flow diagram of an example process 400 for testing a service, according to an embodiment. In an embodiment, the process 400 is implemented by the testing tool 102 (e.g., the testing engine 108 of the fuzzing tool 102) of FIG. 1. The process 400 may utilize the set of operation descriptions 112 to generate, execute and process responses of test request sequences for testing the service 104. In an embodiment, the process 400 may perform one or more iterations of generating, executing and analyzing responses of test request sequences of increasing lengths, until a maximum length n is reached. Each iteration may begin at block 402, at which the variable n, which may initially be set to 0, is incremented by 1. At block 404, a set of valid test request sequences of length n (i.e., including n requests) may be generated, where n is an integer greater than 0. The testing engine 108 may generate the set of valid test request sequences by extending each test request sequence of length (n−1) generated and retained in the previous iteration, by appending a new request, selected from the set of operation descriptions 112, to the test request sequence of length (n−1), and determining whether the newly generated test request sequence of length n is valid by checking whether the dependencies for the appended request are satisfied. If the dependencies for the for the appended request are satisfied, then the testing engine 108 may retain the newly generated test request sequence in the set of test request sequences of length n. On the other hand, if the dependencies for the appended request are not satisfied, then the testing engine 108 may omit the newly generated test request sequence from the set of test sequences of length n.

FIG. 5 is a block diagram of a process 500 for checking dependencies in a newly generated test request sequence of length n, when a particular new request is appended to a test request sequence in a previously generated set of test request sequences on length n−1, according to an embodiment. In an embodiment, the testing engine 108 implements the process 500 at block 404 to check whether dependencies for an appended request are satisfied. At block 502, a set of dynamic objects required as inputs to the appended request is determined. For example, the testing engine 108 may determine the set of dynamic objects required as inputs for the appended request by obtaining indications of required input objects from an operation description, corresponding to the appended request, in the set of operation descriptions 112. At block 504, a set of dynamic objects produced by the preceding requests (if any) in the test request sequence is determined. For example, the testing engine 108 may determine the set of dynamic objects produced by the preceding requests in the test request sequence by obtaining indications of returned objects from respective operation descriptions, corresponding to the preceding requests, in the set of operation descriptions 112. At block 506, it is determined whether all dynamic objects in the set of dynamic objects required as inputs for the appended request (determined at block 502) are included in the set of dynamic objects produced by the preceding requests (determined at block 504). If it is determined at block 506 that each required dynamic object in the set of dynamic objects determined at block 502 is included in the set of produced dynamic objects determined at block 504, this signifies that dependencies for the appended request are satisfied. In this case, the process 500 may proceed to block 508, at which the newly generated test request sequence is retained in (e.g., added to) the set of test request sequences of length n. On the other hand, if it is determined at block 506 that at least one dynamic object in the set of dynamic objects determined at block 502 is not included in the set of produced dynamic objects determined at block 504, this signifies that dependencies for the appended request are not satisfied. In this case, the process 500 may proceed to block 510, at which the newly generated test request sequence is discarded.

Referring back to block 404 of FIG. 4, at block 406, respective test request sequences in the set of valid test sequences of length n generated at block 404 are concretized and executed. To concretize a test request sequence, the testing engine 108 may replace any fuzzable parameters in the last, newly appended, request in the test request sequence with concrete values of corresponding object types. The concrete values for replacing the fuzzable parameters may be obtained from dictionaries of predetermined values of the corresponding object types. The dictionaries may be user-defined, for example. The testing engine 108 may generate multiple concretized test request sequences based on a particular valid test request sequence to include all possible combinations of all of fuzzable object values provided in the dictionaries of the corresponding object types. To limit the number of such test sequences, the dictionaries provided for the respective object types may be relatively small, in some embodiments. For example, each provided dictionary may include only one or several entries. As just an example, a dictionary for an integer type may include only one or several integers (e.g., a dictionary consisting of 0, 1 and −10), a dictionary for a string type may include only one or several stings (e.g., a dictionary consisting of one very long sample string and one empty string), a dictionary for a Boolean type may include True and False, and so on. In some embodiments, for example when relatively larger dictionaries are provided, a sampling technique may be used such that not all dictionary entries are utilized. For example, the testing engine 108 may randomly select, for concretizing a fuzzable object in a request, a subset of one or more entries from the dictionary, and use the selected subset of one or more entries to concretize the fuzzable object in the request. Alternatively, the testing engine 108 may implement a suitable combinatorial technique to perform all-pairs (also referred to herein as "pairwise") testing or, more generally, N-wise testing so that, all possible discrete combinations of dictionary entries for each pair or N-tuple of fuzzable objects in the sequence are utilized. Such techniques may generally reduce the number of concretized test request sequences that are subsequently executed to test the corresponding service.

With continued reference to FIG. 4, block 406 may additionally include executing each concretized test request sequence, and processing responses received from the service 104 in response to execution of the concretized test request sequence. To execute a concretized test request sequence, the testing engine 108 may sequentially execute the requests in the concretized test request sequence, analyze responses received in response to executing the requests, extract an memorize any dynamic objects returned in the responses, and include the memorized dynamic objects as needed in subsequent requests in the concretized test request sequence. Based on processing the responses, the testing engine 108 may determine whether or not the concretized test request sequence is valid. For example, the testing engine 108 may determine that the concretized sequence is valid if the responses indicate successful completion of the concretized test request sequence (e.g., if a last response contains an HTTP code in the 200 range), and may determine that the concretized sequence is not valid if the response does not indicate a successful completion (e.g., if the last response contains an HTTP code not in the 200 range). If the concretized test request sequence is determined to be invalid, then the testing engine 108 may log an error (e.g., log the executed concretized test sequence and the corresponding HTTP code) in an error log that may be stored in a memory coupled to the testing engine 108. The testing engine 108 may discard the invalid concretized test request sequence so that this concretized test request sequence is not used is generating subsequent extended test request sequences, in an embodiment.

Logging errors at block 404 may include clustering (e.g., bucketizing) certain type of errors (e.g., bugs). For example, the testing engine 108 may cluster bugs found based on test request sequences for which an HTTP code in the 500 range ("internal server errors") was received in the corresponding responses. Such errors may be caused by a same combination of requests that may be repeatedly included in test request sequences of greater lengths. Accordingly, the received response may actually not uncover a new error, but rather may correspond to an error that was already discovered in logged in a previous iteration of the process 400. In an embodiment, to facilitate analyses of the error log by a user, the testing engine 108 may cluster such repeated errors in the error log. For example, each time a response with such a code (e.g., an HTTP code in the 500 range) is received, the testing engine 108 may compute all non-empty suffixes of the corresponding test sequence and may search through the error log to determine whether one or more of the non-empty suffixes have already been recorded in the error log. If the testing engine 108 finds an existing entry containing a particular suffix already recorded in the error log, the testing engine 108 may add the new error to a cluster or bucket of the existing entry in the log error. On the other hand, if the testing engine 108 does not find an existing entry containing a particular suffix in the error log, the testing engine 108 may create a new entry and may store the test sequence and its associated error code in the new entry.

Referring still to FIG. 4, at block 408, the testing engine 108 may determine whether or not the maximum test sequence length (max) has been reached. The maximum length max may be preconfigured, or may be user-configurable, in various embodiments. If it is determined at block 408 that the maximum length max has not yet been reached (e.g., if n<max is true), then the process 400 may return to block 402, and another iteration of the process 400 may be initiated. On the other hand, if it is determined at block 408 that the maximum length max has been reached (e.g., if n<max is false), then the process 400 may be completed and accordingly, the process 400 may terminate.

Referring back to block 404, in an embodiment, in each iteration of the process 400, the testing engine 108 generates all possible combinations of test sequences of length n, in an attempt to find errors by searching through all possible combinations of valid test sequences of length n. In other words, the testing engine 108 implements a breadth first search (BFS) by exploring all possible test sequences in each iteration of the process 400, in this embodiment. In other embodiments, the testing engine 108 implements other suitable search strategies. For example, the testing engine 108 may implement a BFS-fast search, in an embodiment. In this embodiment, in each iteration of the process 400, the testing engine 108 may generate at block 404 a set of valid sequences in which each sequence of length n−1 is appended with only one request selected from the set of requests provided in the set of operation descriptions 212. Accordingly, in this embodiment, while in each iteration of the process 400 the testing engine 108 may use each request in the set of sequences of length n−1 to generate a new sequence of length n, not all possible such sequences are generated, reducing the number of valid test request sequences that are generated and executed in each iteration, in this embodiment. As a result, the testing engine 108 may go deeper into testing sequences of greater lengths quicker, in this embodiment. As yet another example, the testing engine 108 may implement a Random Walk search, in yet another embodiment. In this embodiment, in each iteration of the process 400, the testing engine 108 may generate only a single (or only a few) valid test request sequences of length n, for example by randomly selecting one or more test request sequences in the set of test sequences of length n−1, and extending the one or more selected test sequences by appending one or more requests randomly selected from the requests provided in the set of operation descriptions 202. Once the maximum length n is reached, the testing engine 108 may restart the process 400 to begin another Random Walk search, with potentially other random selections, in an embodiment.

Referring briefly to FIG. 6, an example implementation 600 may generally corresponds to the process 400 of FIG. 4, according to an embodiment. The example implementation 600 may be implemented in the testing tool 102 of the testing system 100 of FIG. 1, in an embodiment. For example, the example implementation 600 may be partially implemented by the specification analyzer 106 of the testing tool 102 of the testing system 100 of FIG. 1 and partially implemented by the testing engine 108 of the testing tool 102 of the testing system 100 of FIG. 1. In other embodiments, the example implementation 600 may be implemented by other suitable components of the testing system 100 of FIG. 1, or may be implemented by suitable testing systems different from the testing system 100 of FIG. 1.

Figure 7:
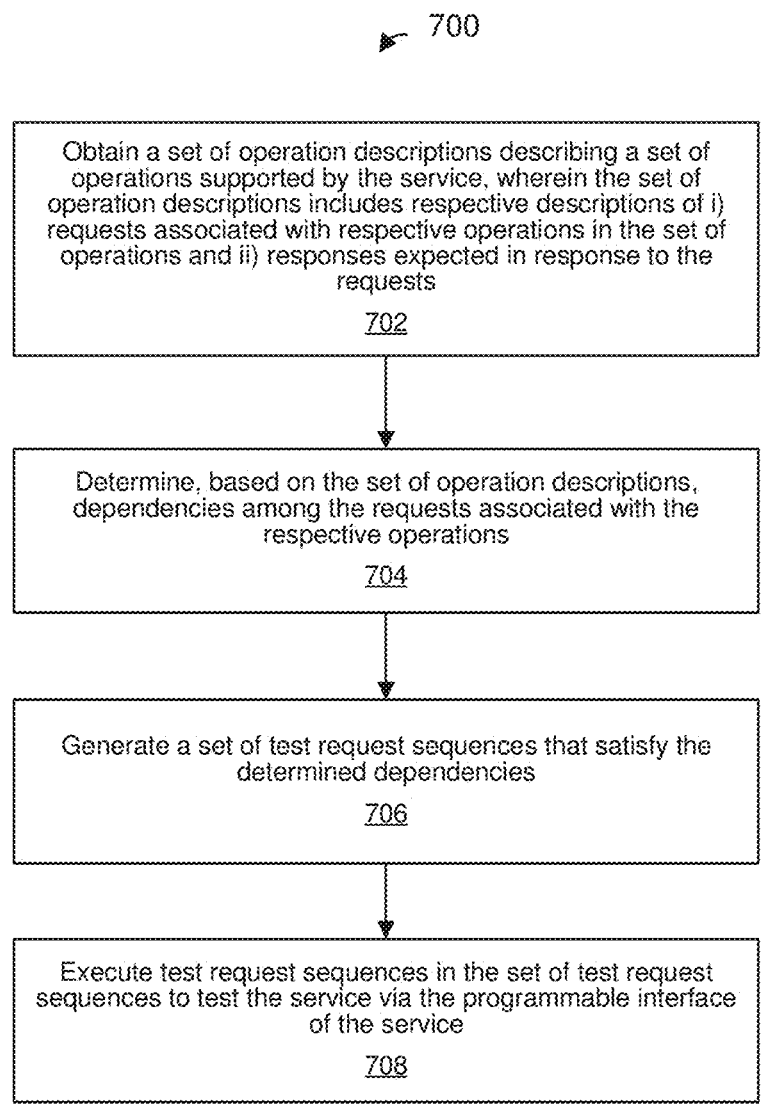
FIG. 7 is a flow diagram of a method that may be implemented by the testing system of FIG. 1 to test a service via a programming interface of the service, according to an embodiment.

FIG. 7 is a flow diagram of a method 700 for automatically testing a service via a programming interface of the service, according to an embodiment. In an embodiment, the method 700 is implemented in conjunction with the testing system 100 of FIG. 1. For example, the method 700 is implemented by the testing tool 102 (e.g., the testing module 108) of the testing system 100 of FIG. 1, in an embodiment. In other embodiments, the method 700 is implemented by suitable components different from the testing tool 102 and/or is implemented in conjunction with testing systems different from the testing system 100. At block 702, a set of operation descriptions is obtained. The set of operation descriptions may describe a set of operations supported by the service. The set of operation descriptions may include, for example, respective descriptions of i) requests associated with respective operations in the set of operations and ii) responses expected in response to the requests. The set of operation descriptions may be obtained from a specification analyzer (e.g., the specification analyzer 106). The specification analyzer may generate the set of operation descriptions by parsing a service specification (e.g., the service specification 110) defining the programming interface of the service. In other embodiments, the set of operation descriptions may be obtained in other suitable manners. For example, the set of operation descriptions may be provided as a direct input to the testing tool 102, e.g., by a user of the testing tool 102.

At block 704, dependencies among the requests associated with the respective operations are determined. Determining the dependencies may include, for example, determining that a first request associated with a first operation in the set of operations should not be executed before a second request associated with a second operation in the set of operations because the second request associated with the second operation takes, as an input, a parameter (e.g., a resource id) returned in response to the first request associated with the first operation. In an embodiment, the dependencies are determined based on the set of operation descriptions obtained at block 702. For example, the dependencies are determined based on i) parameters indicated in the set of operation descriptions as being required as inputs to the respective requests and ii) parameters indicated in the set of operation descriptions as being expected to be returned in response to the respective requests. In other embodiments, the dependencies are determined based on the set of operation descriptions in other suitable manners.

At block 706, a set of test request sequences is generated. In an embodiment, the set of test request sequences may be generated based on the set of operation descriptions obtained at block 702 and the dependencies determined at block 704. The set of test request sequences may be generated to include only those test request sequences that satisfy the dependencies determined at block 704. The set of test request sequences may omit test request sequences for which the dependencies determined at block 704 are not satisfied. Respective requests in the set of test request sequences may be generated based on respective request generation grammars that may be provided in the set of operation descriptions obtained at block 702, in an embodiment. In other embodiments, the respective requests in the set of test request sequences may be generated in other suitable manners.

At block 708, test request sequences in the set of test request sequences may be executed to test the service via the programming interface of the service. Block 708 may include, prior to executing a test request sequence, replacing one or more fuzzable parameters in one or more requests in the test request sequence with values of corresponding parameter types to generate one or more concretized test request sequence based on the test request sequence. In this case, executing the test request sequence may comprise executing each of the one or more concretized test request sequences. The one or more fuzzable parameters may be replaced with values selected from respective dictionaries corresponding to the parameter types. Executing the test request sequences may include processing responses obtained from executing the test request sequences. The responses may be processed based on respective response formats that may be provided for the corresponding operations in the set operation descriptions obtained at block 702. Based on processing the responses, one or more errors may be detected, and the detected errors may be logged in an error log. Logging the one or more errors may include clustering test request sequences causing a same error in a same entry in the error log.

Figure 8:
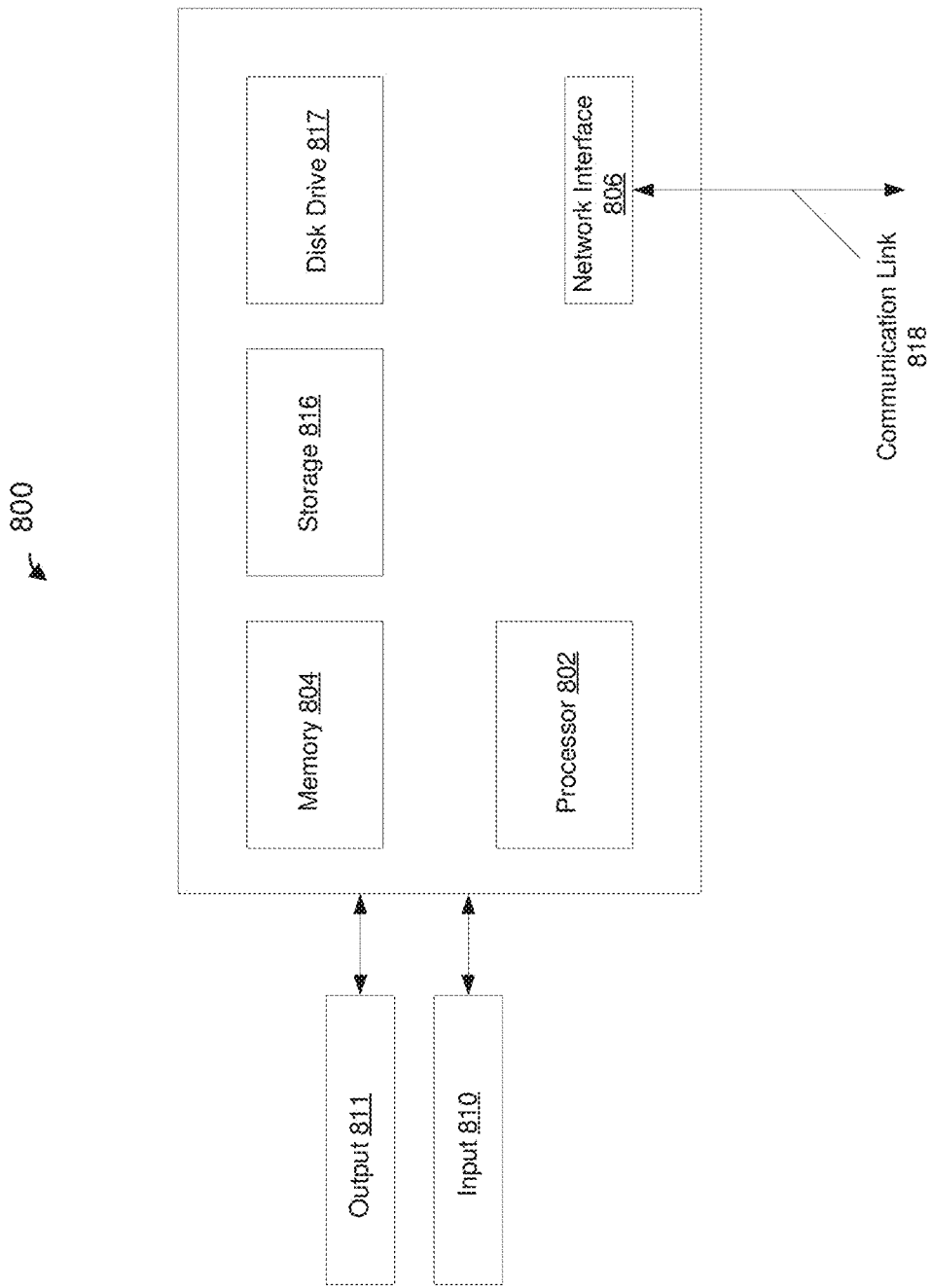
FIG. 8 is a block diagram of a computer system suitable for implementing one or more components of the testing system of FIG. 1, according to an embodiment.

FIG. 8 is a block diagram of a computing system 800 suitable for implementing one or more embodiments of the present disclosure. In its most basic configuration, the computing system 800 may include at least one processor 802 and at least one memory 804. The computing device 800 may also include a bus (not shown) or other communication mechanism for communicating information data, signals, and information between various components of computer system 800. Components may include an input component 810 that processes a user action, such as selecting keys from a keypad/keyboard, selecting one or more buttons or links, etc., and sends a corresponding signal to the at least one processor 802. Components may also include an output component, such as a display, 811 that may display, for example, results of operations performed by the at least one processor 802. A transceiver or network interface 806 may transmit and receive signals between computer system 800 and other devices, such as user devices that may utilize results of processes implemented by the computer system 800. In one embodiment, the transmission is wireless, although other transmission mediums and methods may also be suitable.

The at least one processor 802, which can be a microcontroller, digital signal processor (DSP), or other processing component, processes these various signals, such as for display on computer system 800 or transmission to other devices via a communication link 818. The at least one processor 802 may also control transmission of information, such as cookies or IP addresses, to other devices. The at least one processor 802 may execute computer readable instructions stored in the memory 804. The computer readable instructions, when executed by the at least one processor 802, may cause the at least one processor 802 to implement processes associated with determination of a user context, generation of customized translated content based on the user context, output of the customized translated content, etc. as described above.

Components of computer system 800 may also include at least one static storage component 816 (e.g., ROM) and/or at least one disk drive 817. Computer system 800 may perform specific operations by processor 802 and other components by executing one or more sequences of instructions contained in system memory component 804. Logic may be encoded in a computer readable medium, which may refer to any medium that participates in providing instructions to the at least one processor 802 for execution. Such a medium may take many forms, including but not limited to, non-transitory media, non-volatile media, volatile media, and transmission media. In various implementations, non-volatile media includes optical or magnetic disks, volatile media includes dynamic memory, such as static storage component 816, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a service testing system have been described herein in terms of "modules" or "components," it is noted that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for automatically testing a service via a programming interface of the service, the method comprising obtaining, at one or more hardware processors, a set of operation descriptions describing a set of operations supported by the service, wherein the set of operation descriptions includes respective descriptions of i) requests associated with respective operations in the set of operations and ii) responses expected in response to the requests;

determining, with the one or more hardware processors based on the set of operation descriptions, dependencies among the requests associated with the respective operations;

generating, with the one or more hardware processors, a set of test request sequences that satisfy the determined dependencies, wherein generating the set of test request sequences comprises performing multiple iterations of generating, based on the set of operation descriptions, test request sequences of increasing lengths, wherein performing the multiple iterations includes, in a particular iteration of the multiple iterations, generating test request sequences by adding one or more requests to at least one test request sequence generated in a previous iteration of the multiple iterations; and executing, with the one or more hardware processors, test request sequences in the set of test request sequences to test the service via the programming interface of the service.

2. The method of claim 1, wherein obtaining the set of operation descriptions comprises obtaining the set of operation descriptions by parsing a computer-readable service specification defining the programming interface of the service.

3. The method of claim 1, wherein determining the dependencies among the respective requests comprises determining the dependencies based on i) parameters indicated in the set of operation descriptions as being required as inputs to the respective requests and ii) parameters indicated in the set of operation descriptions as being expected to be returned in response to the respective requests.

4. The method of claim 1, further comprising, prior to executing a test request sequence in the set of test request sequences, replacing, with the one or more hardware processors, one or more fuzzable parameters in one or more requests in the test request sequence with values of corresponding parameter types to generate one or more concretized test request sequences based on the test request sequence, and wherein executing test request sequences in the set of test request sequences includes executing each of the one or more concretized test request sequences.

5. The method of claim 3, wherein replacing the one or more fuzzable parameters includes selecting respective ones of the values for replacing the one or more fuzzable parameters from respective ones of one or more dictionaries of values of corresponding parameter types.

6. The method of claim 4, wherein replacing the one or more fuzzable parameters comprises replacing multiple fuzzable parameters in a request with respective combinations of values selected from the respective dictionaries of values of corresponding parameter types to generate respective ones of multiple concretized test request sequences, and wherein executing test request sequences in the set of test request sequences includes executing the multiple concretized test request sequences.

7. The method of claim 1, wherein performing the multiple iterations of generating, based on the set of operation descriptions, the test request sequences of increasing lengths includes, in the particular iteration of the multiple iterations, generating test request sequences of length n by appending requests to test request sequences of length n−1 generated in the previous iteration of the multiple iterations, wherein n is an integer greater than zero.

8. The method of claim 1, wherein performing the particular iteration of the multiple iterations includes appending the one or more requests to the at least one test request sequence generated in the previous iteration of the multiple iterations.

9. The method of claim 1, wherein executing the set of test request sequences includes executing a request sequence generated in a first iteration of multiple iterations, processing a response received from the service in response to executing the test request sequence to determine whether the response indicates successful completion of execution of the test request sequence, and in response to determining that the response does not indicate successful completion of execution of the test request sequence, i) logging an error associated with the test request sequence and ii) discarding the request sequence from the set of test request sequences so that the request sequence is not used in a subsequent iteration of the multiple iteration sequences.

10. The method of claim 1, further comprising detecting, with the one or more hardware processors, multiple errors based on processing responses received in response to executing the test request sequences in the set of test request sequences; and logging, with the one or more hardware processors in entries of an error log, request sequences that caused the multiple errors, including clustering, in a single entry in the error log, multiple ones of the request sequences that caused a same error.

11. A testing system, comprising:
one or more hardware processors; and
a memory storage device, including instructions that when executed by the one or more hardware processors are operable to provide:
   a specification analyzer configured to parse a computer-readable specification describing a programming interface of a service to generate a set of operation descriptions describing a set of operations supported by the service, wherein the set of operation descriptions includes respective descriptions of i) requests associated with respective operations in the set of operations and ii) responses expected in response to the requests; and
   a testing engine configured to
      determine, based on the set of operation descriptions, dependencies among respective requests associated with the respective operations;
      generate a set of test request sequences that satisfy the determined dependencies, wherein generating the set of test request sequences comprises performing multiple iterations of generating, based on the set of operation descriptions, test request sequences of increasing lengths, wherein performing the multiple iterations includes, in a particular iteration of the multiple iterations, generating test request sequences by adding one or more requests to at least one test request sequence generated in a previous iteration of the multiple iterations; and
      execute test request sequences in the set of test request sequences to test the service via the programming interface of the service.

12. The testing system of claim 11, wherein determining the dependencies among the respective requests comprises determining the dependencies based on i) parameters indicated in the set of operation descriptions as being required as inputs to the respective requests and ii) parameters indicated in the set of operation descriptions as being expected to be returned in response to the respective requests.

13. The testing system of claim 11, wherein the testing engine is further configured to, prior to executing a test request sequence in the set of test request sequences, replace one or more fuzzable parameters in one or more requests in the test request sequence with values of corresponding parameter types to generate one or more concretized test request sequences based on the test request sequence, and wherein executing test request sequences in the set of test request sequences includes executing each of the one or more concretized test request sequences.

14. The testing system of claim 13, wherein the testing engine is further configured to select respective ones of the values for replacing the one or more fuzzable parameters from respective ones of one or more dictionaries of values of corresponding parameter types.

15. The testing system of claim 11, wherein the testing engine is configured to, in the particular iteration of the multiple iterations, generate test request sequences of length n by appending requests to test request sequences of length n−1 generated in the previous iteration of the multiple iterations, wherein n is an integer greater than zero.

16. The testing system of claim 11, wherein performing the particular iteration of the multiple iterations includes appending the one or more requests to the at least one test request sequence generated in the previous iteration of the multiple iterations.

17. The testing system of claim 11, wherein the testing engine is configured to execute the set of test sequences request at least by
   executing a request sequence generated in a first iteration of multiple iterations,
   processing a response received from the service in response to executing the test request sequence to determine whether the response indicates successful completion of execution of the test request sequence, and
   in response to determining that the response does not indicate successful completion of execution of the test request sequence, i) logging an error associated with the test request sequence and ii) discarding the test request sequence from the set of request sequences so that the test request sequence is not used in a subsequent iteration of the multiple iterations.

18. A tangible, non-transitory computer readable medium, or media, storing machine readable instructions that, when executed by one or more processors, cause the one or more processors to:
   obtain a set of operation descriptions describing a set of operations supported by the service, wherein the set of operation descriptions includes respective descriptions of i) requests associated with respective operations in the set of operations and ii) responses expected in response to the requests;
   determine, based on the set of operation descriptions, dependencies among respective requests associated with the respective operations;
   generate a set of test request sequences that satisfy the determined dependencies, wherein generating the set of test request sequences comprises performing multiple iterations of generating, based on the set of operation descriptions, test request sequences of increasing lengths, wherein performing the multiple iterations includes, in a particular iteration of the multiple iterations, generating test request sequences by adding one or more requests to at least one test request sequence generated in a previous iteration of the multiple iterations; and
   cause test request sequences in the set of test request sequences to be executed to test the service via the programming interface of the service.

19. The tangible, non-transitory computer-readable medium or media of claim 18, storing machine readable instructions that, when executed by the one or more processors, cause the one or more processors to obtain the set of operation descriptions by parsing a computer-readable service specification defining the programming interface of the service.

20. The tangible, non-transitory computer-readable medium or media of claim 18, storing machine readable instructions that, when executed by the one or more processors, cause the one or more processors to determine the dependencies among the respective requests based on i) parameters indicated in the set of operation descriptions as being required as inputs to the respective requests and ii) parameters indicated in the set of operation descriptions as being expected to be returned in response to the respective requests.

* * * * *